United States Patent [19]

Fritz et al.

[11] 4,363,304

[45] Dec. 14, 1982

[54] ENGINE IGNITION SYSTEM WITH ANTI-KNOCK TIMING SHIFT

[75] Inventors: Adolf R. Fritz, Stuttgart; Michael Gottschick, Freudental; Alfred Krappel, Ismaning; Johannes Guggenmos, Dirlewang, all of Fed. Rep. of Germany

[73] Assignee: Robert Bosch GmbH, Stuttgart, Fed. Rep. of Germany

[21] Appl. No.: 268,826

[22] Filed: Jun. 1, 1981

[30] Foreign Application Priority Data

Jun. 2, 1980 [DE] Fed. Rep. of Germany ........ 3020868
Dec. 6, 1980 [DE] Fed. Rep. of Germany ........ 3046100

[51] Int. Cl.³ ............................ F02P 5/04; F02B 5/02
[52] U.S. Cl. .................................. 123/418; 123/414; 123/339
[58] Field of Search ................ 123/418, 339, 414, 417

[56] References Cited

U.S. PATENT DOCUMENTS 4,195,603  4/1980  Decker et al. ...................... 123/418
4,268,888  5/1981  Bodig et al. ......................... 123/418
4,338,899  7/1982  Geiger et al. ........................ 123/418

Primary Examiner—Raymond A. Nelli

Attorney, Agent, or Firm—Frishauf, Holtz, Goodman & Woodward

[57] ABSTRACT

The operation of the interrupting switch in the primary circuit of an ignition coil triggers a first timing circuit having a fixed interval or one sometimes modified by engine loading, at the end of which a timing interval signal is generated which lasts for a second interval. The latter is applied to switch a resistor across the timing wave generator to load down its output voltage. In this manner, an engine equipped with a simple ignition shift providing spark advance in the low speed region and then steady or slightly retarding timing thereafter, can be caused to provide a retarding priming shift that sets in at a medium speed, increases and then tapers off with higher speeds so as to cover a speed range in which the engine is particularly sensitive to engine knock and avoiding the inefficiencies which would be necessary if the simple ignition shift system had to be backed off to avoid intersecting the knock boundary. It is also possible to utilize the first timing interval to charge or discharge a capacitor to produce an engine speed signal for biasing the threshold of the interrupter switch for control of the dwell angle with respect to engine speed. Two timing intervals can be determined by a single digital counter reset by each ignition pulse and connected with a decoder set to recognize the ends of successive intervals.

16 Claims, 8 Drawing Figures

ENGINE IGNITION SYSTEM WITH ANTI-KNOCK TIMING SHIFT

This invention concerns ignition systems for internal combustion engines of the kind using an engine-driven ignition timing wave generator that controls an electronic switch in the primary current circuit of an ignition coil and is provided with a circuit for speed-related ignition timing shift operating by loading down the timing wave generator output.

The loading of an inductive timing wave generator by means of an impedance connected across its output for the purpose of ignition timing shift is known, for example, from U.S. Pat. No. 4,195,603. In that type of circuit, however, the ignition timing sets in by a jump at a particular threshold speed. In many cases, however, e.g. where it is desired to fit the timing shift characteristic to the engine knock threshold, it is desirable to modify in a continuous manner the loading of the timing generator signal and to shift the timing back and forth as engine speed increases over the full range of engine speed.

SUMMARY OF THE INVENTION

It is an object of the present invention to provide ignition timing shift for an engine in a manner that fits the engine knock threshold, with a suitable margin, rather closely, thereby improving efficiency. For this purpose, it is a further object of the invention to provide for shift of ignition timing back and forth as operating conditions make desirable anywhere in the entire operating speed range of the engine.

Briefly, a first time delay is provided following a periodic reference point of the current wave of the ignition timing wave generator, for example, the first transition from positive to negative polarity that is commonly used to open the electronic switch to interrupt the primary current of the ignition coil, and then a second timing circuit is provided to produce a time period signal, such as a square or "box car" wave beginning at the end of the first time delay. This time period signal is then applied to the timing shift circuit for loading down the wave generator output during any part of the half wave of a predetermined polarity, for example, of positive polarity, which is coincident with the time period signal. The effect of the time period signal loads down the timing wave generator output for no more than one half wave—the wave "halves" being defined as the portions of the waves which are continuously of a single polarity.

An ignition system with such a timing shift has the advantage that continuous shifting of ignition timing back and forth as speed varies monotonically is made possible. All momentary jumps of the ignition timing provided to the engine can thereby be avoided, thus preventing bucking by the engine as the result of sudden timing shift. The necessary shift intervals can be set and fitted to the engine characteristics very accurately and simply and, in particular, are much more simple to use than thresholds with hysteresis, such as show up with mechanical timing shifts. It is possible to produce very complex timing shift characteristics with respect to engine speed.

Further useful features that can be provided in the circuits of the invention are described in the detailed description that follows the identification of the annexed drawings. Of particular advantage is the use of a single digital counter, associated with a decoder, for providing both the first time delay and the time period signal, as well as any additional time periods that might be involved in a more complex timing shift characteristic. By decoding of particular count regions any number of fixed time period signals, of whatever duration may be suitable and spaced one after another by whatever intervals may be suitable, may be provided as loading signals for loading down the output of the timing wave generator.

Many ignition systems, particularly ignition systems with dwell angle control, are provided with a regulating capacitor arranged to be charged by the voltage of the positive half waves of the timing wave generator. In such systems, the threshold level of the electronic switch that interrupts the ignition coil primary current can be shifted in a manner dependent upon engine speed, under control of the capacitor voltage. This effects the instant of closing more than the instant of opening and thus varies the dwell angle. Such a system would not be operative if the timing shift is produced by loading down the positive half wave of the timing wave generator. A useful provision for maintaining the dwell control function, however, is to utilize the first timing delay of the system of the present invention to charge and discharge an electric storage component (for example, a capacitor) to provide the desired speed signal for the dwell angle regulation system. The capacitor voltage signal is preferably converted into a corresponding current supplied to the terminal of the timing wave generator connected to the electronic switch that interrupts the ignition coil primary current. In this manner, the desired switching threshold of the switch is maintained in spite of loading down a significant part of the timing wave generator.

BRIEF DESCRIPTION OF THE DRAWINGS

The invention is further described by way of illustrative example with reference to the annexed drawings, in which.

DESCRIPTION OF THE ILLUSTRATIVE EMBODIMENTS

Figure 1:
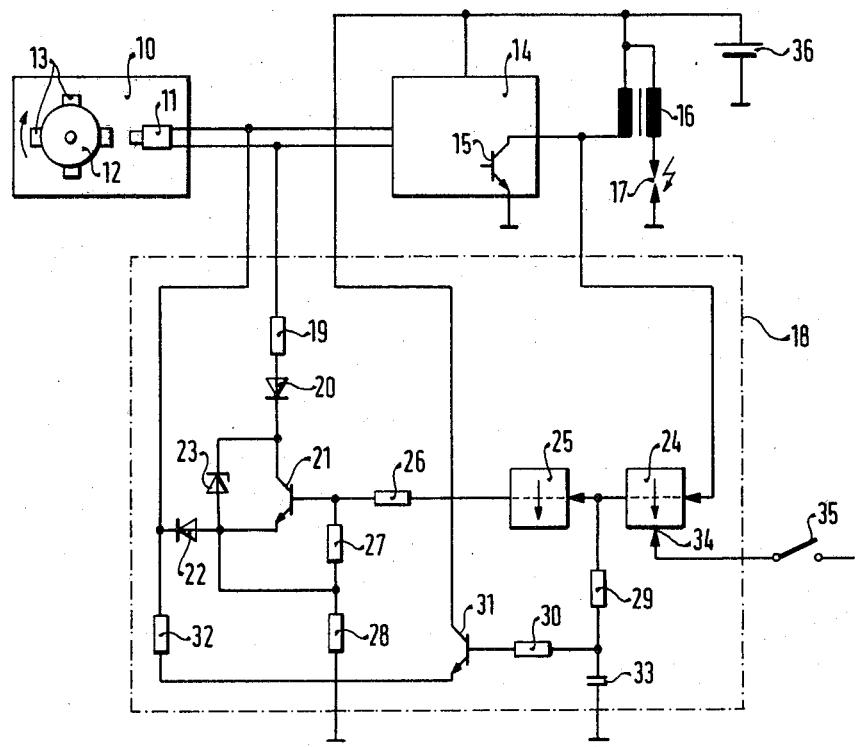
FIG. 1 is a diagram of a circuit according to the invention, utilizing so-called analog-type time delay elements.

In the first embodiment illustrated in FIG. 1, there is a timing wave generator 10 composed of an inductive pickup 11 and a rotating part 12 connected with the crankshaft or camshaft of an internal combustion engine. The rotor 12 has four ignition pulse projections or markers 13. The two output terminals of the pickup 11 are connected with an electronic ignition circuit such as, for example, one of the known circuits illustrated respectively in U.S. Pat. No. 3,605,713, U.S. Pat. No. 4,176,645, or U.S. application Ser. No. 060,772, filed July 26, 1979.

Such ignition circuits serve for preparing a control signal from the timing wave of the timing wave generator and usually include dwell angle control or regulation (of the switch 15). The final stage transistor 15 of the circuit 14 controls the flow of current through the primary winding of an ignition coil 16 in the secondary circuit of which one spark plug 17 is connected.

If there are two or more spark plugs, a mechanical or nonmechanical high voltage distributor can be provided in a known way for firing the spark plugs in proper order. In the circuit 14, provision is made for some basic ignition timing shift under control of engine operation parameters, at least the engine speed parameter, either by a centrifugal force mechanical shift device combined in the timing wave generator 10 or by an electronic shift combined into the ignition circuit 14, as discussed further with reference to FIG. 2.

In FIG. 1, the terminals of the timing wave generator 10 are also connected with a circuit 18 for control of the loading of the timing wave generator. One terminal of the pickup 11 is connected, through the loading resistance 19 and a diode 20 in series therewith, to the collector of a transistor 21, which has its emitter connected, through another diode 22, with the second terminal of the pickup 11. A Zener type protection diode 23 is connected in parallel to the emitter-collector path of the transistor 21. The collector of the final stage transistor 15 of the ignition circuit 14 is connected to the trigger input of a first time-delay circuit 24, which may be a monostable circuit, of the kind commonly used for timing and sometimes known as a "one-shot" multivibrator. The pulse-like output of the delay circuit 24 is connected to trigger another timing circuit 25 of a similar type, from which the rectangular wave output signal is provided through the series resistance 26 to the base of transistor 21. This transistor base electrode is also connected to ground or chasis potential through a voltage divider consisting of two resistors 27 and 28. The tap of the voltage divider 27,28 is connected to the emitter of the transistor 21.

The common connection between the two timing circuits 24 and 25 is connected through a series combination of two resistors 29 and 30 with the base of another transistor 31, of which the emitter is connected through a resistor 32 through the common connection of the diode 22 and the pickup 11. The common connection of the resistors 29 and 30 is connected to a capacitor 33 of which the other terminal is grounded.

A battery 36, which may be the storage battery of a vehicle, provides the necessary current supply for the ignition coil 16, the ignition circuit 14, the collector of the transistor 31, as well as other components such as the timing circuits, for example, in a manner not further illustrated in the drawing.

The timing circuit 24, which is a retriggerable circuit, has a blocking input 34 to block any output signals that may be produced utlimately by an input trigger signal. This blocking input 34 is connected with a switch 35 which operates in response to a particular loading condition of the engine. The switch 35 can, for example, be a throttle-operated switch.

An integrated circuit of the type designation MC 14538, produced by Motorola, can advantageously be used to provide the two timing circuits 24 and 25.

Inductive timing wave generators have an inherent output shift produced by the armature reaction (loading). This effect is utilized in the circuit 18 and is utilized in the conventional circuits for shifting the ignition timing by loading the timing wave generator.

Figure 2:
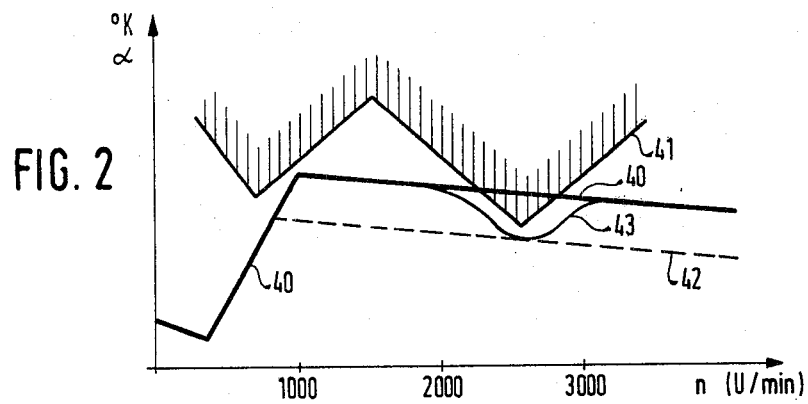
FIG. 2 is a graph of timing shift angle against engine speed, illustrating the necessity of ignition timing shift.

FIG. 2 illustrates a simple ignition timing characteristic 40, such as is produced by a simple mechanical centrifugal force timing shifter. Such a timing shift characteristic describes the dependence of the timing angle $\alpha$ on the engine speed n (marked on the horizontal scale on FIG. 2 in r.p.m.). The slight retrogression of the ignition timing angle $\alpha$ above a speed of 1000 r.p.m. upon further increase of speed is caused by the inherent armature reaction.

The line 41 of FIG. 2 shows an engine knock boundary or threshold for a particular engine, obtained either experimentally or theoretically. Since this knock boundary intersects the ignition shift characteristic 40, in the illustrated case an engine knock will occur between the speeds of 2300 and 2800 r.p.m. With a conventional centrifugal force shift or a simple electronic timing shift circuit, the entire section of the characteristic above 1000 r.p.m. must be drawn back in the "retard" direction, as illustrated by the broken line 42, to avoid knocking.

A substantial power sacrifice would result from such a timing retraction. By means of the circuit 18, such a retardation is producible in a small region only. This is shown by the curve 43. Sacrifice of power and reduction of efficiency of the entire region above 1000 r.p.m. can thus be avoided.

It is assumed that a conventional electronic or mechanical timing shift circuit or device is utilized in the circuits of FIG. 1 to produce the timing shift represented by the solid line 40, with the circuit 18 of the invention superimposing the characteristics represented by the line 43 of FIG. 2.

Figure 3:
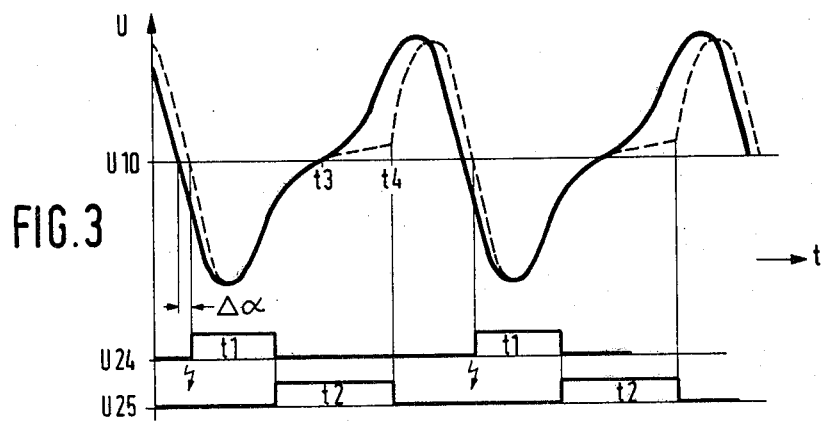
FIGS. 3 and 4 are time course diagrams of time delay and time period signals produced in circuits of the invention and related timing generator wave forms, for explaining the operation of ignition timing shift by timing wave loading at different speeds.

FIG. 3 plots three different voltages U10,U24 and U25 on three different vertical scales of which the zero lines are represented by the three horizontal axes designated U10,U24 and U25, respectively, the time scale being common to all three curves shown. The solid line of curve U10 is the output of the timing wave generator. As this wave passes from + to −, ignition is fired. That normally takes place with the operation of a comparator in the electronic ignition circuit 14. The ignition pulse thus produced triggers the first timing circuit 24, producing a signal sequence U24 also shown in FIG. 2. The holding period of output pulse duration of the first timing circuit U24 is given by t1. The trailing edge of such a pulse U24 triggers the second timing circuit 25 that has a holding time t2. In consequence the pulse sequence U25 is produced.

FIG. 3 illustrates the approximate signal relations for a speed of 2400 rpm as follows:

During the presence of a U25 pulse, the transistor 21 is caused by a connection through the resistor 26 to be in its conducting state, so that it loads down the timing wave generator voltage through the resistor 19, provided that the timing wave generator is producing a positive half-wave. During negative half-waves, the diode 20 blocks the loading. Thus, loading of the generator voltage takes place only from the moment t3, so that an effect on ignition timing begins only at t3.

The broken line shown on the U10 portion of FIG. 3 shows the course of the timing wave voltage as modified by loading. This loading is effective up to the moment t4, thus, until the end of a signal U25, so that only a small voltage rise of the timing wave results. After the loading is over, the timing wave generator voltage quickly approaches the original values represented by the solid line. The transition through zero, however, is nevertheless shifted in the retard direction by the angle α, so that the ignition timing moment is correspondingly shifted. The earliest time that the loading should begin is determined by the combination of the timing circuits 24 and 25, while the timing circuit 25 alone determines how long the loading should last.

The degree of loading is determined by the resistance value of the resistor 19. Thus, in any desired speed region or regions, the ignition timing can be modified between particular values of speed in any desirable manner.

Figure 4:
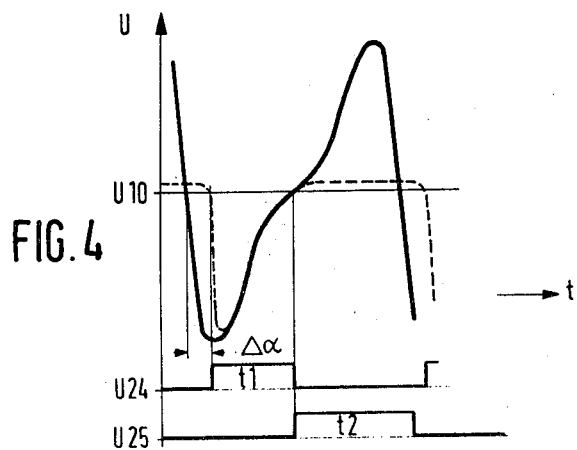

In the illustrated example, the intervals t1 and t2 must be so chosen that the trailing edge of a U25 signal reaches the moment t3 only when its minimum speed of 2000 rpm is reached. Only upon reaching this speed does the timing shift according to the invention begin. Up to about the speed of 2600 rpm, the interval t2 wanders further and further into the positive half-wave, until finally the entire half-wave is bridged by t2. These relations are illustrated in FIG. 4. From here on, the entire positive half-wave is loaded, which leads to the greatest possible ignition timing shift producible by loading. If the speed is raised still further, there arises a growing region at the beginning of the positive half-wave in which no loading takes place because the region t1 bridges the negative half-wave, as well as a growing portion of the positive half-wave. The shift Δα produced by the invention now goes back down, until no overlapping of t2 and the positive half-wave is present any more.

Figure 5:
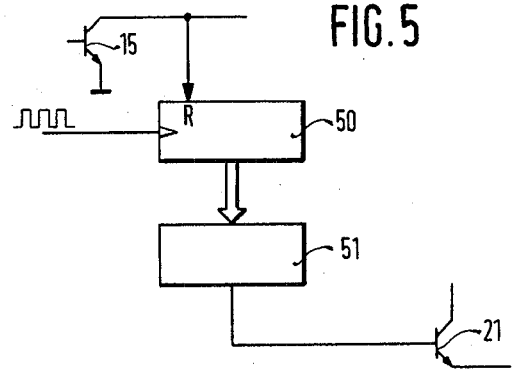
FIG. 5 is a circuit diagram illustrating the use of digital electronic circuits instead of analog circuits in a system of the general type of FIG. 1.

When this happens, the holding time of the timing circuit 24 is greater than the spacing between successive ignition pulses, so that the timing circuit 25 is not triggered any more as discussed further in connection with FIG. 5. The diode 22 serves as protective diode for transistor 21 for protection against positive timing generator voltages at this point. The voltage divider 27, 28 serves to prevent the flow of base current to the pickup 11, which would produce a threshold shift in the ignition circuit 14 during the presence of the negative half-wave.

In accordance with the conventional practice regarding the electronic ignition circuit 14 described above, there is commonly provided in that circuit a capacitor which is charged during a positive half-wave of the timing wave generator and discharged again by a certain amount during the negative half-wave. A speed dependent voltage is thus produced that influences the dwell angle, in a manner dependent upon speed. The switching thresholds are determined by a comparator having a connection to the timing wave voltage, as already mentioned (but not illustrated in the drawing). A feedback of the capacitor voltage to one comparator input then shifts the switching thresholds in a manner dependent upon speed.

The application of the circuit of FIG. 1 to an ignition circuit of the kind shown in U.S. Pat. No. 4,146,645 presents no problems because there the capacitor just mentioned is charged by the supply voltage. For application of the circuit to FIG. 1 to an ignition circuit of the kind of U.S. Pat. No. 3,605,713 or of the kind shown in U.S. application Ser. No. 60,772, filed July 26, 1979, problems are presented because there the charging of this capacitor is produced by the timing wave voltage itself. When the timing wave voltage is loaded down by the resistor 19, the capacitor cannot therefore be sufficiently charged, so that an undesired bias level shift would result. That result is prevented by the circuit 29–33. The capacitor 33 is charged through the resistor 29 during the interval t2, so that a speed dependent voltage is thereby obtained. This speed dependent voltage is then coupled to a timing wave generator terminal through the resistor 30, the transistor 31 and the resistor 32, so that in spite of the loading of the timing wave voltage already described, undesirable effects do not arise: No undesired bias level shift and no undesired reduction of the dwell angle. The transistor 31 is connected as an emitter follower and provides a current through the resistor 32 that depends upon the value of voltage across capacitor 33. The limiting resistor 30 assures that the capacitor 33 will not be completely discharged when the terminal of the pickup 11, to which the resistor 32 is connected, goes strongly negative.

The second embodiment, shown in FIG. 5 only to the extent that it differs from the first, illustrates a digital constitution of the timing circuits 24 and 25 and possibly other time-period-establishing means that might be necessary or desirable in particular cases. The collector of the transistor 15 is in this case connected to the resetting input R of a digital counter 50 to which a counting pulse frequency is supplied. Count outputs of this counter 50 are connected with a decoding stage 51 which can, for example, be a logical gate array. The output of the decoding stage 51 is connected to the base of the transistor 21.

The counter 50 is set back to zero with every ignition pulse and then begins to count upwards anew. The decoding stage 51 is so set that beginning with the count value reached after the lapse of the time interval t1, this decoding stage 51 provides an output signal that continues until, after a lapse of further time interval t2, a further predetermined count value is reached, when the decoding stage 51 again blocks the aforesaid output terminating the aforesaid output signal.

In the case of FIG. 5, the resetting of the counter 50 prevents the t2 counting range from being reached. In the circuit of FIG. 1, it may be necessary to provide a connection (not shown) to reset circuit 24 if the input shown in FIG. 1 does not automatically restart the t1 period and it may be necessary to inhibit triggering of circuit 25 when circuit 24 is reset and/or restarted.

Thus, the transistor in FIG. 1 is turned on during the time interval t2. The great advantage of the digital circuit illustrated in FIG. 5 is that the decoding stage 51 can also be constituted so as to decode other counting intervals, so that by means of a single counter 50 and single decoding stage 51, a practically unlimited number of timing circuits and time intervals can be established by corresponding signals.

Thus, at various times output signals of different lengths and thereby control signals for the transistor 21 can be generated by which the timing wave generator can be loaded down at various times for different intervals. A highly exact fitting of the timing shifts to the engine knock threshold is there possible, particularly when several regions of the engine knock boundary project into a simple (e.g., linear) basic ignition shift characteristic. If the loading of the engine in different speed regions should be provided in multiple form with different values of the resistor 19, so that in dependence on the decoded interval, which is to say the decoded counting range, the different circuit branches can be called into play by the decoding stage 21.

As shown in FIG. 1, the circuit 18 can be assembled very simply and can also be provided in retrofit fashion to an existing ignition system, for example, for after-the-fact fitting to an engine knock boundary or for fitting the same basic ignition system to various internal combustion engines having different knock boundaries. It is also evident that the circuit 18 can also be embodied into the electronic ignition circuit 14.

Figure 6:
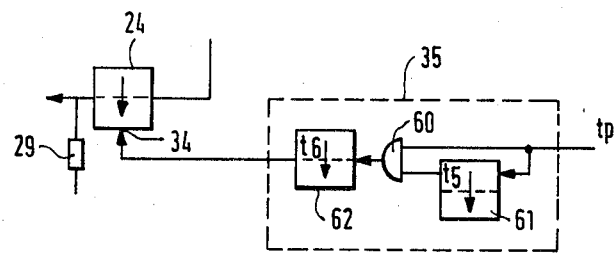
FIG. 6 is a circuit diagram of a transducer for producing a load signal.

FIG. 6 is a diagram of an example of a circuit for the switch 35 operating as a load sensitive switch of a kind that is advantageously applicable to an internal combustion engine equipped with electronic fuel injection. The fuel injection signal tp is in this case supplied both to an AND-gate 60 and to the trigger input of a time delay circuit 61 having the time constant t5. The output of the delay circuit 61 is supplied to another input of the AND-gate 60. The output of the AND-gate 60 is connected through another time interval circuit 62 having the time constant t6 over to the blocking input of the time interval circuit 24.

Figure 7:
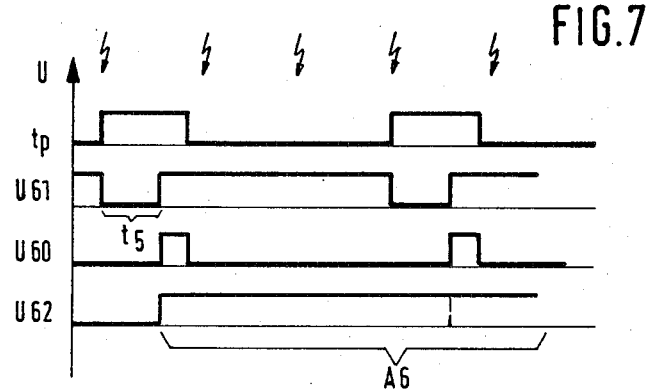
FIG. 7 is a signal/time diagram for explaining the operation of the transducer of FIG. 6.

The manner of operation of the circuit example shown in FIG. 6 is explained below with reference to the signal/time diagram given in FIG. 7. The fuel injection signal tp, the length of which is a measure for the load condition of the internal combustion engine, is compared in the circuit components 60 and 61 with the length (duration) t5 of the output signal of the time interval circuit 61. The AND-gate 60 provides an output signal U60 only if and when the signal length of tp is greater than t5. This subcircuit thus operates as a threshold stage with the threshold value t5 corresponding to a particular load condition of the engine that produces a fuel injection signal of that duration. The signal sequence U60 is supplied to the retriggerable time interval circuit 62, the holding time of which is so determined that it remains always in active (triggered) condition during regular appearance of the signals U60. Since usually the injection signal follows after every third ignition event, the time t6 must accordingly be larger than the maximum possible spacing of three ignition signals, for the usual 4-cylinder gasoline engine with fuel injection, this naturally only for conditions in which the signal tp is longer than t5. The triggering of the time interval circuit 62 by the second U60 signal is represented by a broken line. The blocking input 34 of the time interval circuit 24 is so controlled by an output signal U62 of the time interval circuit 62 that blocking is thereby removed. Ignition timing shift is thus effectively produced by transducer loading only when the load condition of the engine has reached a magnitude for which the signal tp is longer in duration than t5.

Instead of the switching in of ignition timing shift by transducer loading beginning at a particular load condition of the engine, this extra shift can of course, be produce continuously with increasing load. This could be produced for example by deriving an analog magnitude from the load condition to represent the latter and using that magnitude signal to control or affect the holding time of the time interval circuit 24.

Figure 8:
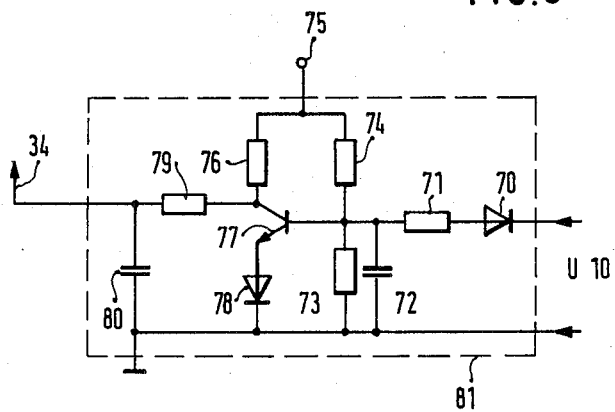
FIG. 8 is a circuit diagram of an embodiment of a speed-responsive switch.

In FIG. 8 is given an example of a circuit for a speed responsive switch designed to produce ignition timing shift by transducer loading only during the running condition of the engine, thus above a certain speed. This precaution prevents the disadvantageous possibility of an upward surge of the ignition voltage when the engine is braked to a stop. Such a possible voltage surge would lead to noticeable strain on the components, particularly insulation layers.

The voltage U10 is applied to a series connection of a diode 70 with a resistor 71 and a capacitor 72. In parallel to the capacitor 72, a discharge resistor 73 is connected, which together with a resistor 74 forms a voltage divider inserted between ground and a positive voltage supply terminal. The positive supply voltage source is preferably a stabilized one. In parallel with the voltage divider 74,73 there is connected the series combination of a resistor 76, the collector-emitter path of a transistor 77 and a diode 78. The base of the transistor 77 is connected to the tap of the voltage divider 74,73. The collector of the transistor 77 is connected through a resistor 79 with the blocking input 34 of the time interval circuit 24. A smoothing capacitor 80 is connected between the blocking input 34 and ground. The circuit thus described composed of the elements 70-80 forms a speed responsive switch 81. The operation of the circuit shown in FIG. 8 is produced by supplying the transducer voltage U10 to the subcircuit 71-73 operating as an integrating stage. Here the diode 70 assures that only negative half-waves of the transducer voltage are taken into account. In principle, of course, only positive half-waves could be acted on. In the illustrated case, if the diode 70 is conducting, the capacitor 72 is charged through the resistor 71. During the positive half-wave that then follows, the diode 70 blocks the and the capacitor 72 is discharged through the resistor 73. When the motor is stopped, there is no transducer voltage and accordingly, as the result of the voltage divider 74-73, a positive voltage is applied to the base of the transistor 77, so that this transistor conducts. The output voltage of the speed responsive switch applied to the blocking input 34 accordingly lies at the zero level. With increasing speeds, the capacitor 72 is charged negatively, the result of which the voltage at the base of the transistor 77 decreases. This transistor thereby gradually goes over into the blocking condition. In dependence upon the response level of the time interval circuit 24, the spark retard shift is not switched in until a speed n1 of, e.g., 100 r.p.m. and from a further speed threshold n2 of, e.g., 1200 r.p.m. the spark retard switch is assuredly switched in. This conforms with the hysteresis of the response thresholds of circuits, particularly of integrated circuits. The RC combination 79,80 serves for smoothing the output control voltage. The diode 78 serves to protect the base-emitter path of the transistor 77.

If the circuit of FIG. 8 is used in combination with a load switch 35, then both potentials can be supplied to the blocking input 34, for example through an AND-gate or similar logic member. This then means that the retard shift will be switched in only when at the same time a certain load is present and a particular engine speed is exceeded.

Although the invention has been described with reference to particular illustrative examples, it will be understood that further variations and modifications are possible within the inventive concept.

I claim:

1. An ignition system for an internal combustion engine having an inductive ignition timing wave generator (10) arranged to control an electronic switch (15) in the primary current circuit of an ignition coil (16) and provided with circuit means for ignition timing shift by loading of the output of said wave generator, said system also comprising the improvement which consists in that:

first timing means (24, 50, 51) are provided for deriving from the current wave in said primary circuit a signal delayed by a first timing period (t1) with respect to a periodic reference point of said current wave, and second timing means (25, 50, 51) are provided for supplying a time period signal (t2) beginning with the occurrence of said delayed signal and applying said time period signal to said timing shift circuit (19, 20, 21) for loading down said wave generator output, during and only during, any part of a half wave of a predetermined polarity of said output coincident with said time period signal.

2. An ignition system as defined in claim 1 in which said first and second timing means are constituted by a digital counter (50) and a decoding stage (51), said counter being arranged to be set to a predetermined content value upon occurrence of each said periodic reference point of said current wave, said decoding stage (51) being arranged to furnish said delayed signal and said time period signal following each said reference point of said current wave.

3. An ignition system as defined in claim 1, in which a rectifier element (20) is provided in said timing shift circuit (19, 20, 21) to assure that only a half wave of said wave generator output of said predetermined polarity is loaded down by said timing shift circuit.

4. An ignition system as defined in claim 1 having also a speed dependent switching-on level shift, in which system there is provided a storage device (33) chargeable and dischargeable by said first timing means for storing a signal corresponding to speed, which storage device (33) is connected with an output terminal of said timing wave generator (10).

5. An ignition system as defined in claim 4 in which conversion means (31, 33) are provide for converting the output value of said storage device (33) into a current value and for providing the output to said output terminal of said timing wave generator.

6. An ignition system as defined in claim 5 in which a current limiting resistance (30) is interposed between the storage device (33) and said conversion means (31, 32).

7. An ignition system as defined in claim 1 in which means are provided (35) for supplying a signal dependent upon the load of said internal combustion engine and applying said load signal to said first timing means for modifying the timing of the application of said time period signal to said timing shift circuit (19, 20, 21).

8. An ignition system as defined in any one of claims 1–7 in which said periodic reference point of said current wave is a polarity transition which utilized to cause the opening of said electronic switch (15) in said primary current circuit.

9. An ignition system as defined in claim 7, in which said means (35) for supplying a signal dependent upon the load of said engine comprises a switch responsive to a predetermined level of engine load for supplying a signal to said first timing means for modifying the timing of the application of the time period signal to said timing shift circuit (19, 20, 21).

10. An ignition system as defined in claim 9, in which said engine is equipped with fuel injection means responsive to a fuel injection signal, the time duration of which increases with engine load, and said load switch comprises a threshold value stage (60–62) for providing the output signal of said load switch when said fuel injection signal has a duration longer than a predetermined signal duration (t5).

11. An ignition system as defined in claim 9, in which said threshold value stage comprises a difference circuit (60, 61) for determining the difference in signal duration of said fuel injection signal from said predetermined signal duration (t5) and providing an output to a retriggerable time interval circuit (62).

12. An ignition system as defined in claim 11, in which said difference circuit is constituted by an inverting time interval circuit (61) and an AND circuit (40), so connected that the two inputs of said AND circuit are respectively the input trigger signal of said inverting time interval circuit (61) and the output signal of said time interval circuit (61).

13. An ignition circuit as defined in claim 7, in which means for producing a speed-dependent signal are also provided for modifying the timing of the application of said time period signal to said timing shift circuit (19, 20, 21).

14. An ignition system as defined in claim 13, in which said means for producing a signal dependent upon engine speed is constituted as a speed responsive switch (81).

15. An ignition system as defined in claim 14, in which said speed responsive switch (81) comprises a capacitor (72) having charging and discharging resistances (71, 73) and connected for being charged for a half-wave of a particular polarity of the output of said inductive ignition timing wave generator (10) and further connected for modifying the timing of the application of said time period signal to said timing shift circuit (19, 20, 21) in response to the voltage across said capacitor (72).

16. An ignition system as defined in claim 15, in which said capacitor is connected to control said first timing means (24) for modifying the beginning of the time period signal applied by said second timing means (25, 50, 51) to said timing shift circuit (19, 20, 21).

* * * * *